United States Patent [19]
Watanabe et al.

[11] Patent Number: 5,687,808
[45] Date of Patent: Nov. 18, 1997

[54] FOUR WHEEL DRIVE MECHANISM

[75] Inventors: Jun Watanabe; Kenro Takahashi; Yorihito Nakao, all of Yokosuka; Shigeru Kamegaya, Tokyo; Naohiko Inoue, Yokohama, all of Japan

[73] Assignee: Nissan Motor Co., Ltd., Kanagawa, Japan

[21] Appl. No.: 405,673

[22] Filed: Mar. 17, 1995

[30] Foreign Application Priority Data

| Mar. 18, 1994 | [JP] | Japan | 6-049146 |
| Mar. 18, 1994 | [JP] | Japan | 6-049147 |
| Mar. 18, 1994 | [JP] | Japan | 6-049148 |
| Apr. 28, 1994 | [JP] | Japan | 6-092545 |

[51] Int. Cl.$^6$ ............................................. B60K 17/356
[52] U.S. Cl. ........................... 180/243; 180/242; 180/307
[58] Field of Search ................................ 180/242, 243, 180/305, 307, 308

[56] References Cited

U.S. PATENT DOCUMENTS

| 3,811,525 | 5/1974 | Stuart | 180/243 |
| 3,994,353 | 11/1976 | Greene | 180/242 |
| 4,480,502 | 11/1984 | Nembach | 180/243 |
| 4,667,763 | 5/1987 | Nembach | 180/243 |
| 5,368,120 | 11/1994 | Sakai | 180/243 |
| 5,540,299 | 7/1996 | Tohda | 180/242 |

FOREIGN PATENT DOCUMENTS

| 63-176734 | 7/1988 | Japan . |
| 1-223030 | 9/1989 | Japan . |
| 1-262374 | 10/1989 | Japan . |
| 3-213683 | 9/1991 | Japan . |

*Primary Examiner*—Anne Marie Boehler
*Attorney, Agent, or Firm*—Lowe, Price, LeBlanc & Becker

[57] ABSTRACT

A torque is transmitted between a fluid pressure pump driven together with drive of a vehicle, and a fluid pressure motor that rotates together with driven wheels. The fluid pressure motor has two ports, and rotates in accordance with the direction of fluid supply to the ports. Fluid is circulated from one port to the other according to the input of rotation torque from the driven wheels. A high pressure flowpath connected to the pump outlet, and a low pressure flowpath connected to the pump inlet, are connected to these ports, and the connection direction is reversed when the rotation direction of the drive wheels is reversed. The low pressure flowpath is therefore always at low pressure regardless of the rotation direction of the drive wheels, and by controlling the pump supply flowrate so as not to exceed a predetermined value, torque is not transmitted when the vehicle is running at high speed.

34 Claims, 13 Drawing Sheets

FOUR WHEEL DRIVE MECHANISM

FIELD OF THE INVENTION

This invention relates to a four wheel drive vehicle wherein the drive force of the engine is transmitted to the front and rear wheels, and more specifically, to a four wheel drive mechanism wherein the drive force of the engine is transmitted via a fluid.

BACKGROUND OF THE INVENTION

In a four wheel drive vehicle wherein the drive force of the engine is transmitted to the front and rear wheels via mechanical means, the vehicle chassis is generally heavier and fuel consumption greater than in the case of a two wheel driven vehicle.

In order to remedy these drawbacks Tokkai Sho 63-176734 and Tokkai Hei 1-223030 published respectively in 1988 and 1989 by the Japanese Patent Office disclose a four wheel drive vehicle wherein the drive force is transmitted via hydraulic means.

In this four wheel drive vehicle, the front wheels are driven by the engine. The vehicle is provided with a first hydraulic pump that rotates together with the front wheels and a second hydraulic pump that rotates together with the rear wheels. The outlet of the first pump is connected to the inlet of the second pump, and the outlet of the second pump is connected to the inlet of the first pump. During normal running the front and rear wheels rotate at the same speed, so the discharge amounts of the first and second pumps are balanced, and drive force is not transmitted to the rear wheels. However, if the front wheels slip so that they rotate faster than the rear wheels, the discharge flowrate of the first pump exceeds that of the second pump, the discharge oil of the first pump drives the second pump as a hydraulic motor, and drive force is transmitted to the rear wheels. Consequently, four wheel drive does not operate continuously, and drive force is transmitted to the rear wheels only on a part-time basis when the front wheels slip.

In such a four wheel drive vehicle, a propeller shaft is not required to transmit drive force. The vehicle can therefore be made more lightweight, the passenger compartment can be made more spacious and fuel consumption is lower. At the same time, as mechanical means are not used to transmit the drive force, the vehicle makes less noise and vibration.

However, as the working oil flows in different directions to the front and rear wheels according to the rotation direction of the wheels, the two hydraulic pipes connecting the two pumps must both be able to withstand high pressure. Further, if valves are installed in the pipes, they must be adapted to both high and low pressure which tends to increase the cost of the hydraulic equipment.

Besides, in this four wheel drive mechanism, the diameters of the front and rear tires are assumed to be the same, but in practice there is a difference of wear in the front and rear tires even if the diameters are the same. This produces minute differences in the diameter, and leads to differences in the rotation speeds of the front and rear wheels. If, for example, the diameter of the front wheel tires is less than that of the rear wheel tires, the discharge flowrate of the first pump constantly exceeds that of the second pump, thereby placing a constant load on the first pump that may increase fuel consumption.

SUMMARY OF THE INVENTION

It is therefore an object of this invention to simplify the hydraulic circuit in a four wheel drive vehicle wherein drive force is transmitted by oil pressure.

It is a further object of this invention to increase tolerance to the difference of rotation speeds of the front and rear wheels, and thereby prevent transmission of unnecessary drive force.

It is a still further object of the invention to make the transition from four wheel drive to two wheel drive smooth.

In order to achieve the above objects, in a preferred embodiment, this invention provides a four wheel drive mechanism comprising drive wheels driven by an engine, driven wheels that rotate due to contact with a road surface, a fluid pressure pump mechanism, a fluid pressure motor mechanism, a high pressure flowpath, and a low pressure flowpath.

The pump mechanism is driven together with the drive wheels. The pump mechanism is provided with a fluid inlet and outlet, and pressurizes a fluid aspirated from the inlet so as to discharge it from the outlet.

The motor mechanism rotates together with the driven wheels. The motor mechanism have two ports for aspirating and discharging the fluid, and drives the driven wheels by supplying a pressurized fluid to one of the ports. On the other hand, it circulates the fluid from one port to the other port according to an input of rotation torque from the driven wheels. The motor mechanism has a larger flow rate than the pump mechanism when the rotation speeds of the drive wheels and the driven wheels are equal.

A high pressure flowpath is connected to the outlet of the pump mechanism and a low pressure flowpath is connected to the inlet of the pump mechanism.

Further provided are a mechanism for connecting the high pressure flowpath and low pressure flowpath to the aforesaid two ports of the motor mechanism, and a mechanism for limiting a discharge flowrate of the pump mechanism so as not to exceed a predetermined value. The connecting mechanism reverses a direction of connection when a rotation direction of the drive wheels is reversed.

According to an aspect of this invention, the limiting mechanism comprises a throttle valve interposed in the inlet, and the opening of this valve decreases when a pump discharge pressure rises above a set pressure.

According to another aspect of this invention, the connecting mechanism is formed in a one-piece construction with the motor mechanism.

According to yet another aspect of this invention, the motor mechanism comprises a capacity control mechanism that varies a fluid flowrate per unit rotation of the motor mechanism according to a flowrate of the low pressure flowpath.

Preferably, this capacity control mechanism increases the fluid flowrate of the motor mechanism as the rotation speed of the driven wheels rises until the flowrate in the low pressure flowpath reaches a set value, and maintains the fluid flowrate at a constant level when the flowrate in the low pressure flowpath exceeds the set value.

Alternatively, the capacity control mechanism increases the fluid flowrate of the motor mechanism at a first rate of increase with respect to a rotation speed of the driven wheels when the flowrate in the low pressure flowpath does not exceed a set value, and increases the fluid flowrate at a second rate of increase less than the first rate with respect to the rotation speed when the set value is exceeded.

According to yet another aspect of this invention, the fluid flowrate per unit rotation of the motor mechanism is set to be larger than a fluid discharge amount per unit rotation of the pump mechanism, and the four wheel drive mechanism further comprises a flowpath provided with a check valve that supplies low pressure fluid to the high pressure flowpath.

In this case, it is preferable that the four wheel drive mechanism further comprises a mechanism for increasing a fluid discharge flowrate of the pump mechanism at a first rate of increase with respect to a rotation speed of the drive wheels when the rotation speed does not exceed a set value, and increases the fluid discharge flowrate at a second rate of increase less than the first rate with respect to the rotation speed when the set value is exceeded.

It is further preferable that the four wheel drive mechanism further comprises a relief valve for discharging the fluid from the high pressure flowpath at a predetermined relief pressure and a mechanism for decreasing this relief pressure when the rotation speed is equal to or greater than the set value.

Alternatively, the four wheel drive mechanism further comprises a relief valve for discharging the fluid from the high pressure flowpath at a predetermined relief pressure, an orifice interposed in the low pressure flowpath, and a mechanism for decreasing the relief pressure as a pressure upstream of the orifice rises.

The pump mechanism and increasing mechanism may comprise a plurality of pumps having different flowrate characteristics.

The limiting mechanism comprises, for example, an intake throttle valve interposed in the inlet, an opening of the throttle valve decreasing when a pump discharge pressure rises above a set pressure. This set pressure is set lower than a maximum value of the relief pressure.

The decreasing mechanism preferably decreases the relief pressure effectively to zero when the discharge flowrate reaches a predetermined upper limit.

It is also preferable that the four wheel drive mechanism further comprises an orifice in the low pressure flowpath, and the decreasing mechanism comprises a mechanism for decreasing the relief pressure according to a pressure rise upstream of this orifice.

According to yet another aspect of this invention, the four wheel drive mechanism further comprises a mechanism for limiting a pressure in the high pressure flowpath at a predetermined level.

According to yet another aspect of this invention, the pump mechanism comprises a pump wherein the inlet and outlet are reversed according to a rotation direction of the drive wheels, and a mechanism for respectively connecting the inlet to the high pressure flowpath and the outlet to the low pressure flowpath when the direction is reversed.

According to yet another aspect of this invention, the limiting mechanism comprises a mechanism for decreasing the discharge flowrate according to an increase of rotation speed of the drive wheels above a predetermined rotation speed of the drive wheels.

The details as well as other features and advantages of this invention are set forth in the remainder of the specification and are shown in the accompanying drawings.

DESCRIPTION OF THE PREFERRED EMBODIMENTS

Figure 1:
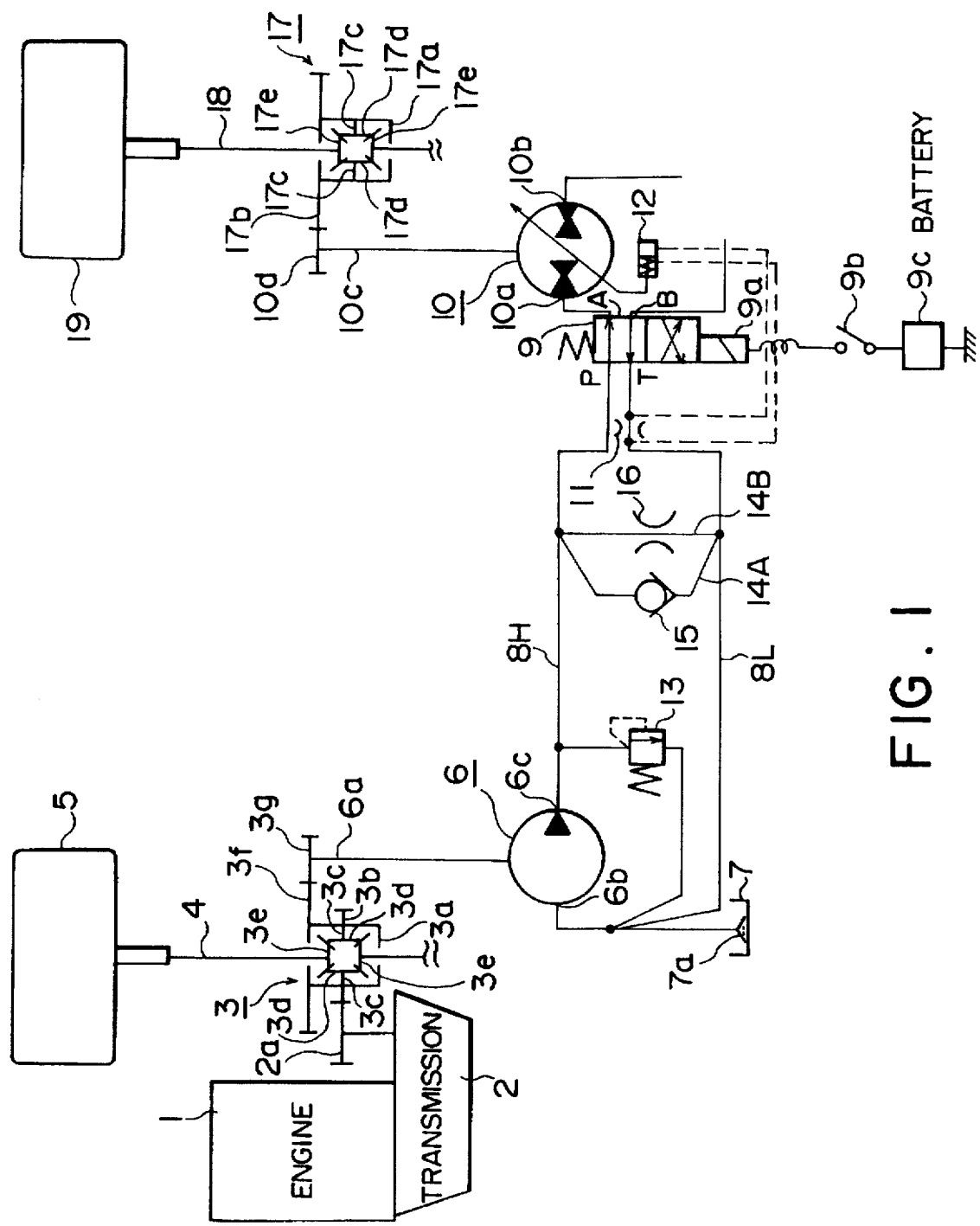
FIG. 1 is a schematic diagram of a four wheel drive system according to a first embodiment of this invention.

Referring to FIG. 1 of the drawings, the rotation of an engine 1 is input to a front wheel differential device 3 via a gearbox 2, and the output of the front wheel differential device 3 is transmitted to a front wheel axles 4.

The front wheel differential device 3 comprises a ring gear 3b fixed in a gear case 3a, and a pair of pinions 3d together with a pair of side gears 3e housed in the gear case 3a. The ring gear 3b engages with a pinion drive gear 2a linked to the output shaft of the gearbox 2, and rotates the gear case 3a. The pinions 3d are respectively fixed on shafts 3c, the shafts 3c being free to rotate in the gear case 3a via bearings. Each side gear 3e is fixed to an end of each axle 4 inserted in the gear case 3a from both sides. The axles 4 are supported free to rotate, and the side gears 3e grip the pinions 3d from both sides. By means of this arrangement, when the output shaft rotates, the pinions 3d rotate about the axles 4 together with the gear case 3a in a vertical plane that includes the shafts 3c, and cause each side gear 3e to rotate together with each axle 4. Further, due to the fact that the pinions 3d themselves rotate due to a difference in the rotation resistances of the axles 4, the axle 4 which has lower resistance is made to rotate more than the axle 4 which has higher resistance.

This four wheel drive vehicle is basically driven by the rotation of the front wheels 5, drive force being transmitted to the rear wheels 19 when necessary.

A ring gear 3f is therefore installed adjacent to the ring gear 3b in the gear case 3a, and the rotation of the gear case 3a is input to a rotation shaft 6a of a piston pump 6 via a gear 3g that engages with the ring gear 3f.

An inlet 6b of the piston pump 6 is connected to a strainer 7a of a tank 7, and is simultaneously connected to a tank port T of a four-way valve 9 via a low pressure pipe 8L. An outlet 6c of the piston pump 6 is connected to a pump port P of the four-way valve 9 via a high pressure pipe 8H.

The piston pump 6 is a fixed capacity pump that aspirates working oil from the inlet 6b and discharges it from the outlet 6c regardless of the rotation direction of the shaft 6a. A throttle is provided at the inlet of the piston pump 6, and due to the action of this throttle, the discharge flowrate increases in proportion to the rotation speed of the front wheels from 0 to a predetermined value $V_1$, and then levels off to a maximum flowrate $Q_{lmax}$ above $V_1$ as shown by the crooked line $L_1$ in FIG. 2(a)–(c). The concept of varying flowrate characteristics by providing a fixed or variable throttle at the inlet in this way is for example disclosed in Tokkai Hei 1-262374 and Tokkai Hei 3-213683 published In 1989 and 1991 respectively by the Japanese Patent Office. Hereinafter, this type of pump will be referred to as an intake throttle pump.

The four-way valve 9 is operated by a solenoid 9a, and in the normal position when the solenoid 9a is not energized, the pump port P is connected to a port A and the tank port T to a port B respectively. In the offset position when the solenoid 9a is energized, the pump port P is connected to the output port B, and the tank port T to the port A, respectively.

These ports A and B are respectively connected to ports 10a and 10b of a swash plate motor 10. The swash plate motor 10 is a variable capacity motor that varies the rotation speed of a shaft 10c according to the variation of a swash plate angle, and it also functions as a pump by input of rotation force from the shaft 10c.

When the four-way valve 9 is in the normal position, the high pressure pipe 8H is connected to the port 10a and low pressure pipe 8L to the port 10b, and the swash plate motor 10 rotates the shaft 10c in the forward motion direction of the vehicle. When the four-way valve 9 is in the offset position, the low pressure pipe 8L is connected to the port 10a and the high pressure pipe 8H to the port 10b, so the motor 10 rotates the shaft 10c in the reverse motion direction of the vehicle. The four-way valve 9 is fitted to the motor 10 in a one-piece construction, and the output ports A and B are directly connected to the ports 10a and 10b.

The solenoid 9a of the four-way valve 9 is connected to a DC power supply 9c via a switch 9b that detects the shift position of a shift lever of the gearbox 2, the solenoid 9a being energized only when the shift lever has been moved to the reverse motion position.

A gear 10d is fitted to the shaft 10c of the swash plate motor 10, and this gear 10d engages with a ring gear 17b fixed to a rear wheel differential device 17. The construction of the rear wheel differential device 17 is substantially the same as that of the aforesaid front wheel differential device 3. It is provided with a pair of pinions 17d supported free to turn via a shaft 17c in a gear case 17a, and a pair of side gears 17e that engage with the pinions 17d so as to grip them. Each of the side gears 17e is fixed to each rear wheel axle 18, each rear wheel 19 being joined to each axle 18.

An orifice 11 is provided in the low pressure pipe 8L in order to control the flowrate of the swash plate motor 10. A hydraulic cylinder 12 varies the inclination angle of the swash plate based on the upstream/downstream pressure differential of the orifice 11, and the orifice 11 has the flowrate characteristics shown by the crooked line $L_2$ in FIG. 2(a). The flowrate therefore increases in direct proportion to the rotation speed up to a wheel rotation speed of $V_1$. When the wheel rotation speed reaches $V_1$, a flowrate of $Q_2$ is obtained exceeding the maximum discharge flowrate $Q_{lmax}$ of the piston pump 6, and the flowrate is then gradually increased with the wheel rotation speed.

The capacities of the piston pump 6 and swash plate motor 10, and the gear ratios between the gears 3f, 3g and 10d, 17b, are therefore set such that the flowrate of the motor 10 is always greater than the discharge flowrate of the piston pump 6 for the same wheel rotation speed. A relief valve 13 that opens at a certain pressure and returns discharge off to the inlet 6b, is provided as a torque control means between the inlet 6b and outlet 6c of the piston pump 6. A connecting pipe 14A provided with a check valve 15 and a connecting pipe 14B provided with a fixed orifice 16, are also connected in parallel between the high pressure pipe 8H and low pressure pipe 8L.

When the vehicle begins to move forward, the shift lever is held in the forward motion position, the shift position detecting switch 9b does not energize the solenoid 9a, and the four-way valve 9 is held in the normal position. When an accelerator pedal of the vehicle is depressed, therefore, the rotation of the engine 1 is transmitted to the front wheel differential device 3 via the gearbox 2, and the front wheels 5 are made to rotate in the forward motion direction via the front wheel differential device 3.

At the same time, the shaft 6a of the piston pump 6 is rotated, the piston pump 6 aspirates working oil from the tank 7, and discharges it to the high pressure pipe 8H. This high pressure working oil passes through the motor 10 and returns to the inlet 6b of the pump 6 via the low pressure pipe 8L.

Figure 2A:
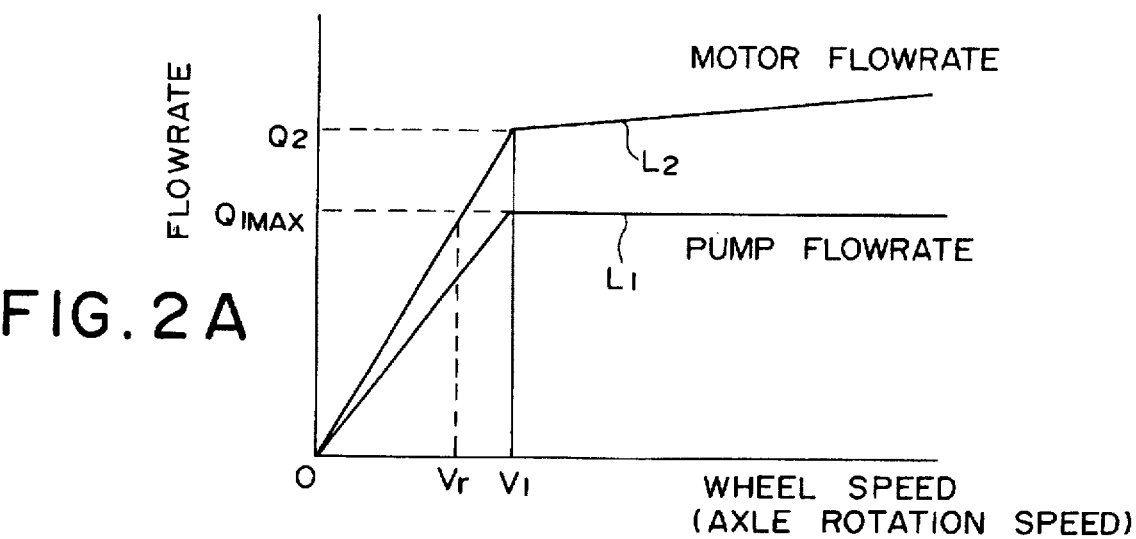
FIG. 2 is a graph showing flowrate characteristics of a piston pump and swash plate motor, and possible substitutes, according to the first embodiment of this invention.

Since the discharge flowrate of the motor 10 is set to be greater than the discharge flowrate of the piston pump 6 for a similar wheel rotation speed $V_r$ as shown In FIG. 2(a), all of the working oil discharged by the pump 6 is aspirated by the motor 10 and the pressure in the high pressure pipe 8H does not rise when the vehicle is running on a road surface with high friction, e,.g. a dry road. In other words, the motor 10 does not function as a hydraulic motor, and the rear wheels 19 rotate due to friction with the road surface instead of the drive force of the motor 10. The part of the intake flowrate of the motor 10 that cannot be supplied by the pump 6, is supplied by the low pressure pipe 8L via the check valve 15 of the connecting pipe 14A.

Arranging a difference in the discharge flowrates of the pump 6 and motor 10, also covers the difference in the rotation speeds of the front and rear wheels 4 and 18 due to differences of diameter arising from the wear of the tires, etc. In other words, provided that speed differences between the front and rear wheels due to differences of tire diameter are within the set discharge flowrate difference range, drive force is not transmitted from the pump 6 to the motor 10, so the engine 1 continues to drive only the front wheels. In this state, the load on the pump 6 is very small, and fuel consumption is the same as in a two wheel drive vehicle.

On the other hand, if the vehicle is started on a road surface with low friction such as a road covered with ice or snow, the driven front wheels slip on the road surface, and the rotation speed difference $\Delta N$ between the front and rear wheels increases. As a result, when the discharge flowrate of the pump 6 exceeds the flowrate of the motor 10, the pressure of the high pressure pipe 8H rises, the increased pressure rotates the motor 10, and rotation force is transmitted to the rear wheels 19 via the shaft 10c and axle 18. Therefore, even the front wheels 5 slip, drive force is transmitted to the rear wheels 19 and the vehicle starts smoothly.

Figure 3:
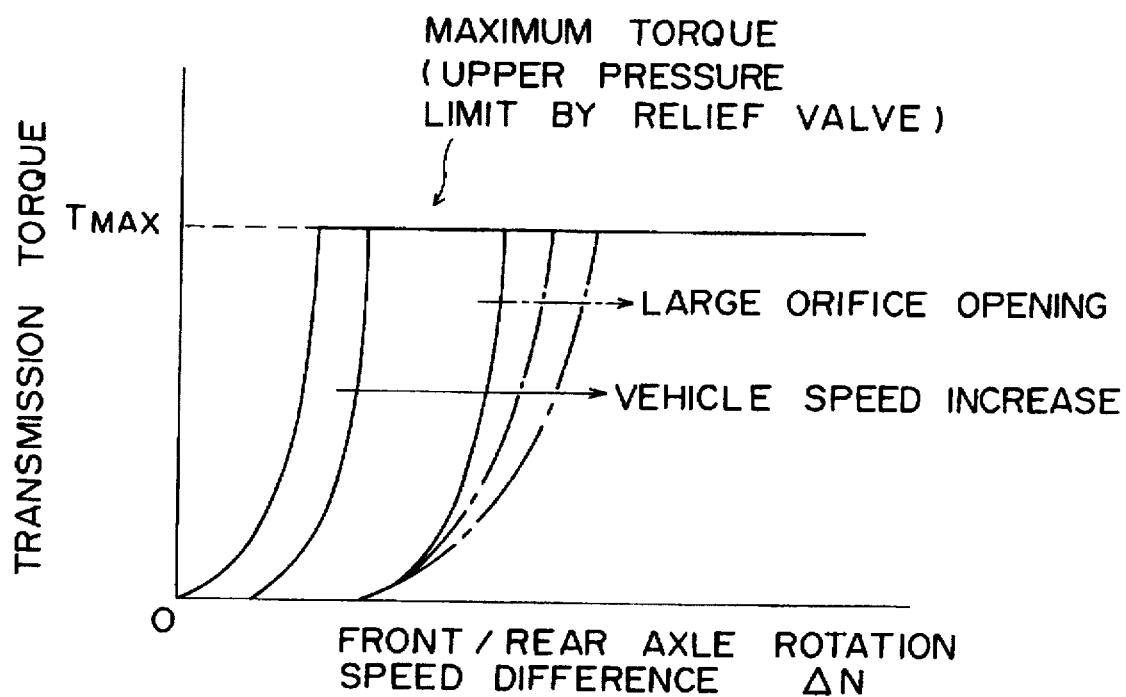
FIG. 3 is a graph showing characteristics of a transmission torque between front and rear wheels according to the first embodiment of this invention.

The torque transmitted to the rear wheels 19 is generated only when a rotation speed difference appears between the front and rear wheels as shown in FIG. 3. This torque increases sharply with increase of rotation speed difference, but its maximum value $T_{max}$ is controlled by the pressure limit of the relief valve 13. A higher torque than this does not act on the rear wheel differential device 17 and shaft 10c, hence these parts are not required to have such high strength, the vehicle may be made more lightweight, fuel consumption is lower and manufacturing costs can be reduced.

The minimum difference of rotation speeds needed to generate torque to the rear wheels is less the lower the vehicle speed, as seen in FIG. 3. This is due to the fact that the discharge flowrate difference between the pump 6 and motor 10 increases with higher wheel rotation speed, as shown in FIG. 2(a). In FIG. 2(a), the front/rear wheel rotation speed difference for the same discharge flowrate increases as the front wheel rotation speed increases from 0 to $V_1$, but after the flowrate of the motor 10 exceeds the maximum flowrate $Q_{tmax}$ of the pump 6, the discharge flowrate of the pump 6 never exceeds that of the motor, and torque cannot therefore be transmitted to the rear wheels 19 from the pump 6 via the motor 10. Due to these flowrate characteristics, four wheel drive is not performed when it is not required, i.e. when the vehicle is running at high speed.

Further, when the flowrate exceeds $Q_2$ at a rear wheel rotation speed of $V_1$, the flowrate increase is controlled by the inclination angle. Even at high running 349 speeds, therefore, the working oil flowrate between the pump 6 and motor 10 does not become excessively large, hence there is no need to increase pipe diameters and makes valves larger. Further, there is no risk of frequent pressure losses and cavitations associated with high flowrates, low fuel consumption is achieved, and the whole four wheel drive system can be made more compact.

Figure 5A:
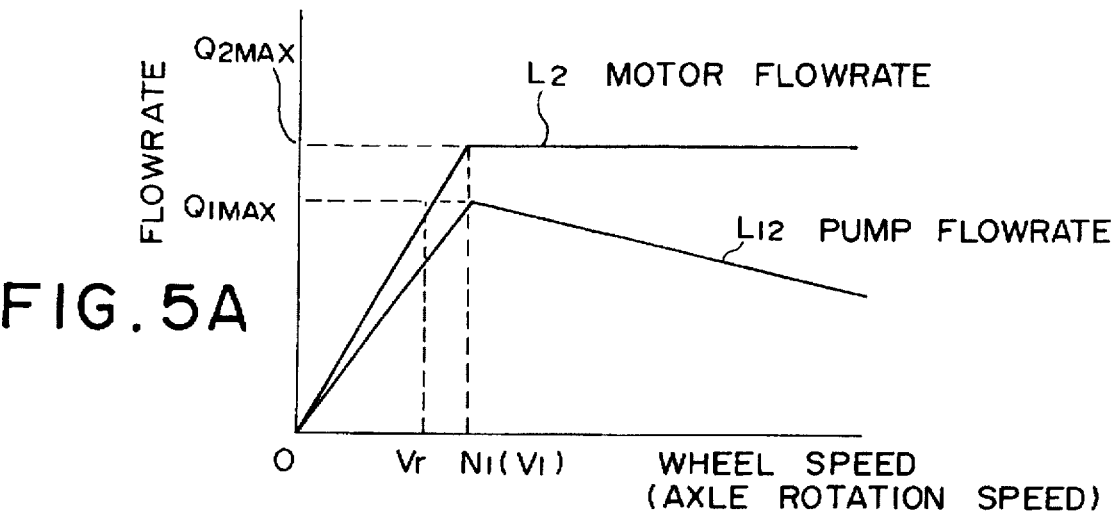
FIG. 5 is similar to FIG. 2, but showing other possible substitutes.

If the flowrate characteristics of the pump 6 are set so as to decrease with increase of rotation speed after the front wheel rotation speed exceeds the predetermined value $V_1$, as shown by the crooked line $L_{12}$ in FIG. 5(a), increase of resistance of the high pressure pipe 8H with increase of front wheel speed is suppressed. This definitively prevents the occurrence of cavitation of the pump 6 at high rotation speeds, which again contributes to reduction of load on the engine 1 and lowers fuel consumption.

Figure 5B:
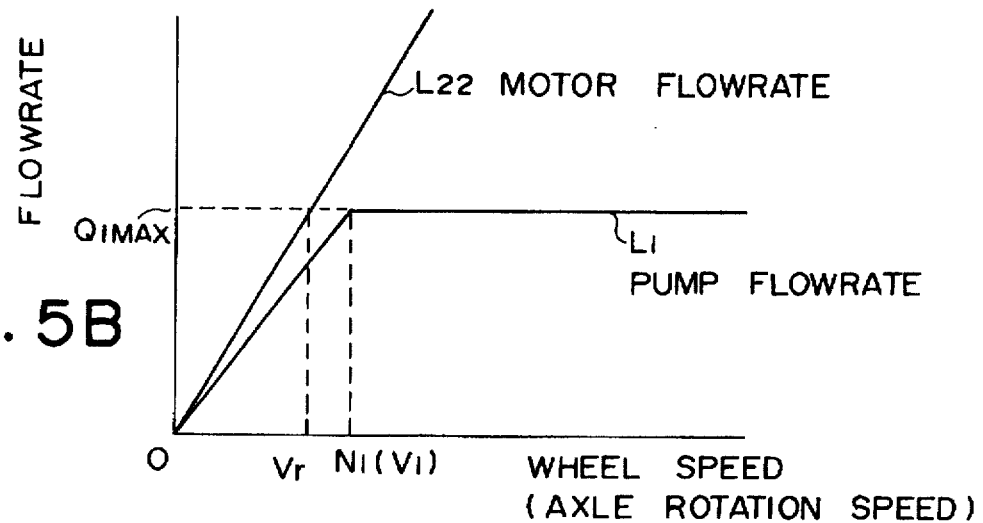

Alternatively, instead of the motor 10, a fixed capacity hydraulic motor having the flowrate characteristics shown by the line $L_{22}$ in FIG. 5(b) may be used. In this case, not only the four-way valve 9 but all parts up to the check valve 15 are integrated with the hydraulic motor so as to form an oil path such that the aspiration resistance is small even at high flowrates. This permits a major simplification of the hydraulic motor, and as the hydraulic cylinder 12 is then unnecessary, the cost of the four wheel drive mechanism can be reduced.

According to this embodiment, the front/rear differential pressure of the orifice 11 is led to the hydraulic cylinder 12, but as the downstream side of the orifice 11 is open to the tank 7, the hydraulic piping can be simplified by taking only the upstream pressure to the cylinder 12, and driving the cylinder 12 by the differential between this pressure and atmospheric pressure.

When the aspiration flowrate of the motor 10 is insufficient, working oil is supplied by the pipe 14A, and if the orifice 11 is installed downstream of the connection between the pipe 14A and the low pressure pipe 8L, the connection between the pipe 14A and low pressure pipe 8L is then upstream of the orifice 11. This makes it easy to supply working oil to the motor 10 via the pipe 14A, and has an advantageous effect on preventing cavitation.

If the orifice 11 is provided on the side of the high pressure pipe 8H, the front/rear wheel rotation speed difference is small, and under no-load conditions when drive force is not transmitted from the pump 6 to the motor 10, the orifice 11 contributes to the aspiration resistance of the motor 10 so that cavitation occurs easily. The orifice 11 must therefore be provided on the side of the low pressure pipe 8L.

The point where the transmission torque begins to increase may be set freely according to the dimensions of the fixed orifice 16 of the connecting pipe 14B. The flow resistance of the orifice 16 varies depending on the viscosity variation with temperature of the working oil, and as there is a high flow resistance at low temperature, the torque begins to increase early. These characteristics present an advantage in winter, when four wheel drive is often required.

Figure 4:
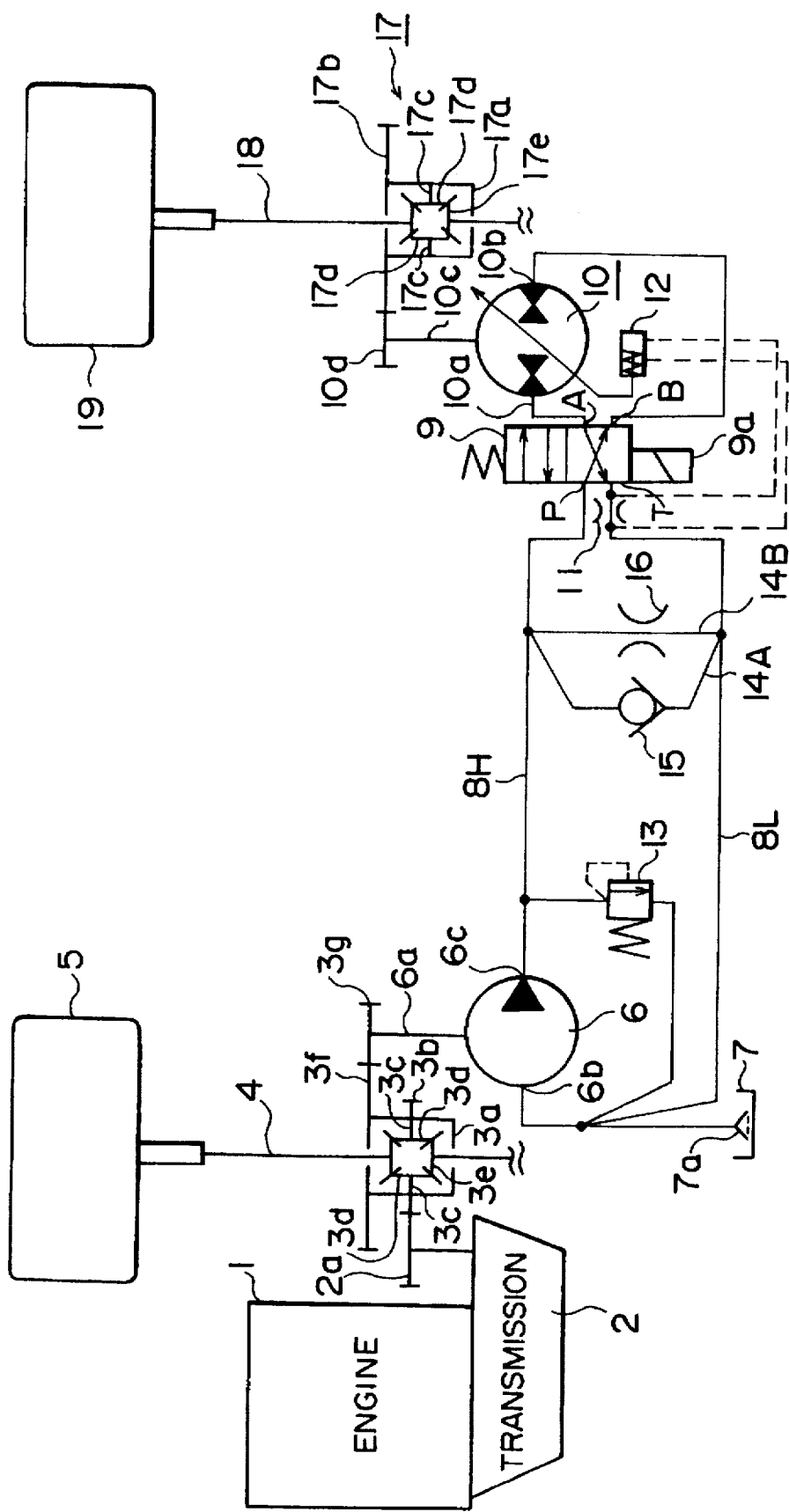
FIG. 4 is similar to FIG. 1, but showing a case when a vehicle is running backwards.

When the shift lever is put in the reverse position so as to reverse the vehicle, the shift position detecting switch 9b switches ON, and the energized solenoid 9a changes the four-way valve 9 over to the offset position as shown in FIG. 4. The working oil in the high pressure pipe 8H is therefore supplied to the port 10b of the motor 10, and the motor 10 rotates in the opposite direction to that of forward motion. The working oil that has passed the motor 10 is discharged from the port 10a to the low pressure pipe 8L and aspirated by the inlet 6b of the pump 6. The rear wheels rotate in the reverse direction together with the motor 10.

Even when the vehicle is moving backwards, the torque transmission is exactly the same as in the case of forward motion. When the front wheels 5 slip and at least a certain front/back wheel rotation speed difference has emerged, a pressure arises in the high pressure pipe 8H, and a torque according to this pressure is transmitted to the rear wheels 19 via the motor 10. When the front/wheel rotation speed difference is small, the intake of the motor 10 is deficient, and this deficiency is compensated by supplying the high pressure pipe 8H from the low pressure pipe 8L via the check valve 15 in the pipe 14A.

The pressure conditions in the high pressure pipe 8H and low pressure pipe 8L are therefore the same even when the vehicle is reversing, and so costly pressure-withstanding pipe need be used only for the high pressure pipe 8H. Also, as the relief valve 13, check valve 15 and orifice 16 function in the same way as in the case of forward motion, they need be provided only for the case of unidirectional flow and the construction of the hydraulic circuit is simple.

During braking, the front wheel rotation speed is generally less than that of the rear wheels. In the case of a four wheel drive vehicle based on front wheel drive as in the case of this embodiment, therefore, torque is not transmitted to the rear wheels when the vehicle is braked. Further, in this four wheel drive system the torque is not transmitted until the difference of the rotation speeds of front and rear wheels reaches a certain level. There is therefore little risk of interference with the vehicle's anti-skid control.

Figure 6:
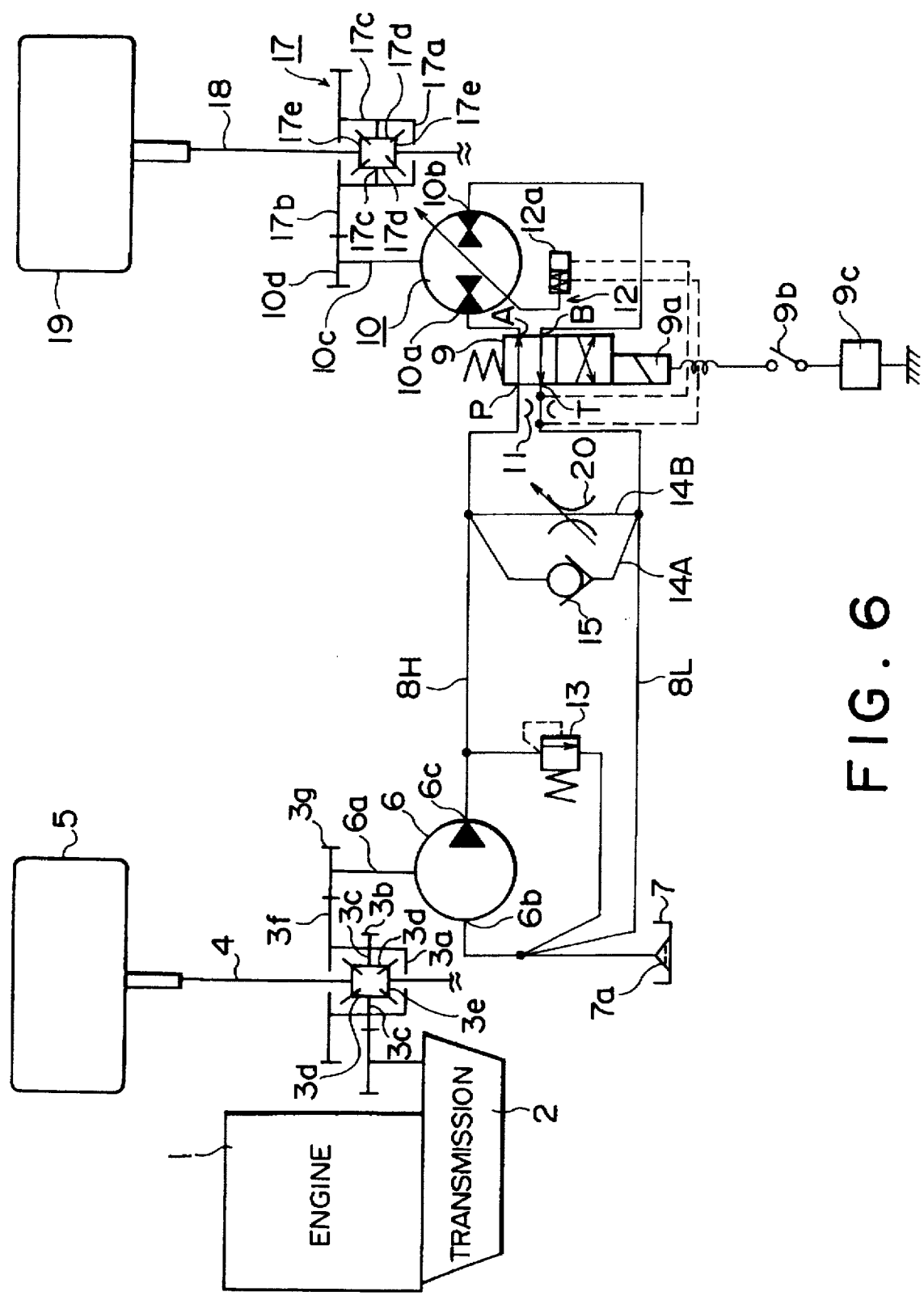
FIG. 6 is a schematic diagram of a four wheel drive system according to a second embodiment of this invention.

FIG. 6 shows a second embodiment of this invention.

According to this embodiment, instead of the orifice 16 of the first embodiment, a variable orifice 20 is used so that the point at which torque is transmitted can be adjusted freely.

The rate of increase of torque transmission relative to front/rear wheel rotation speed difference ΔN can therefore be varied as shown by dotted lines in FIG. 3, and the torque transmission characteristics can be set as the driver of the vehicle desires.

Figure 7:
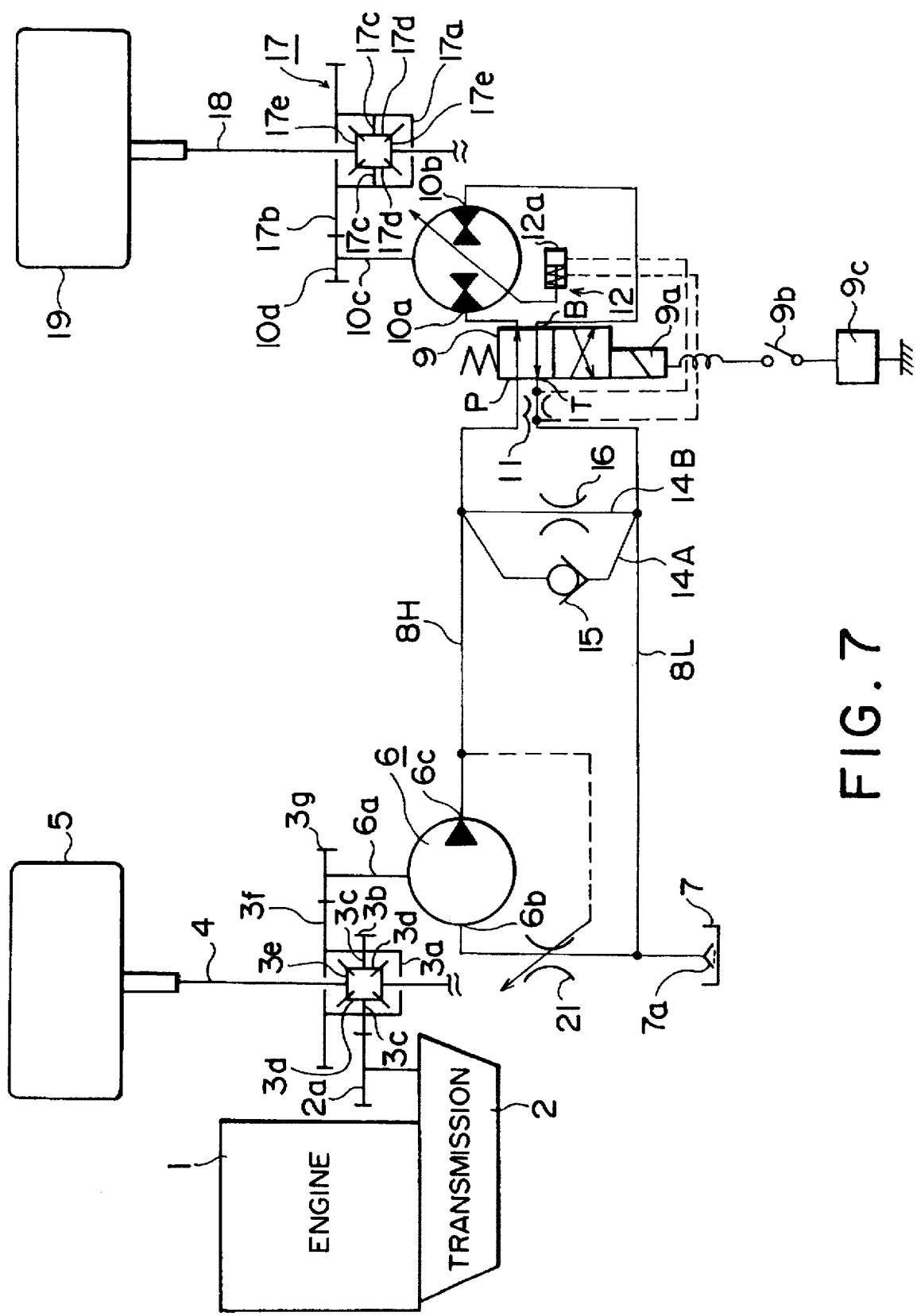
FIG. 7 is a schematic diagram of a four wheel drive system according to a third embodiment of this invention.

FIG. 7 shows a third embodiment of this invention.

According to this embodiment, instead of the relief valve 13 as a means of limiting the transmission torque, an intake throttle 21 that responds to pilot pressure is installed at the inlet of the pump 6, and the discharge pressure of the pump 6 is led to the intake throttle 21 as a pilot pressure. When the pump discharge pressure rises above a specified pressure, the aspiration resistance of the pump 6 increases so that increase of discharge flowrate is suppressed, and torque above a certain level is not transmitted.

If the relief valve 13 is used, oil temperature increases when the engine is running continuously on high load, but if the intake throttle 21 is used instead, the actual pump discharge amount decreases so that less heat is produced.

Figure 8:
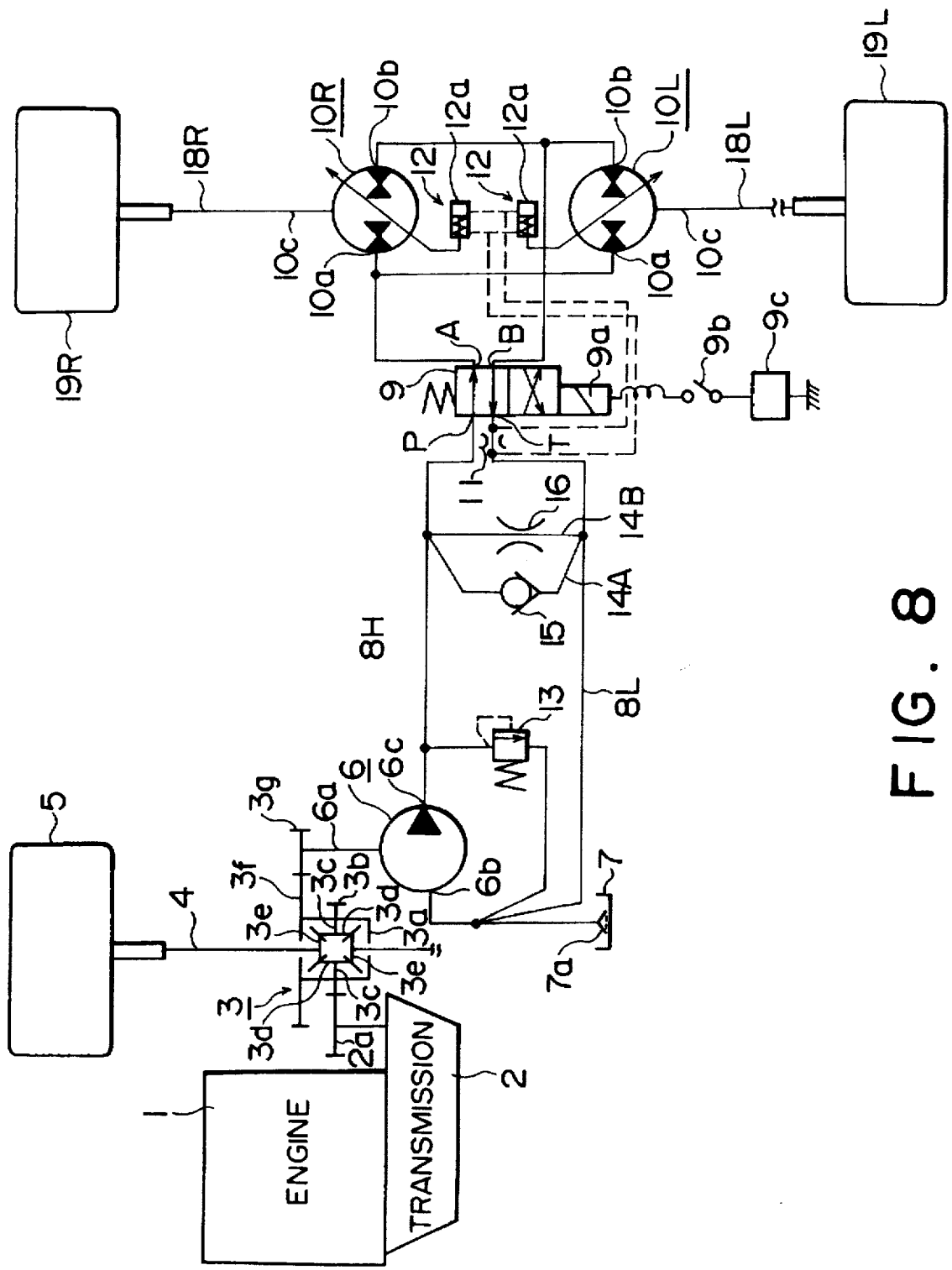
FIG. 8 is a schematic diagram of a four wheel drive system according to a fourth embodiment of this invention.

FIG. 8 shows a fourth embodiment of this invention.

According to this embodiment, instead of the rear wheel differential device 17, axles 18L, 18R of left and right wheels 19L, 19R are driven independently by variable capacity motors 10L, 10R. When the load on the left and right wheels is different as for example when the vehicle makes a turn, a discharge flowrate difference according to the load difference arises in the motors 10L, 10R. The same effect is therefore obtained as in the case of a differential device, and the differential device may be omitted.

Figure 9:
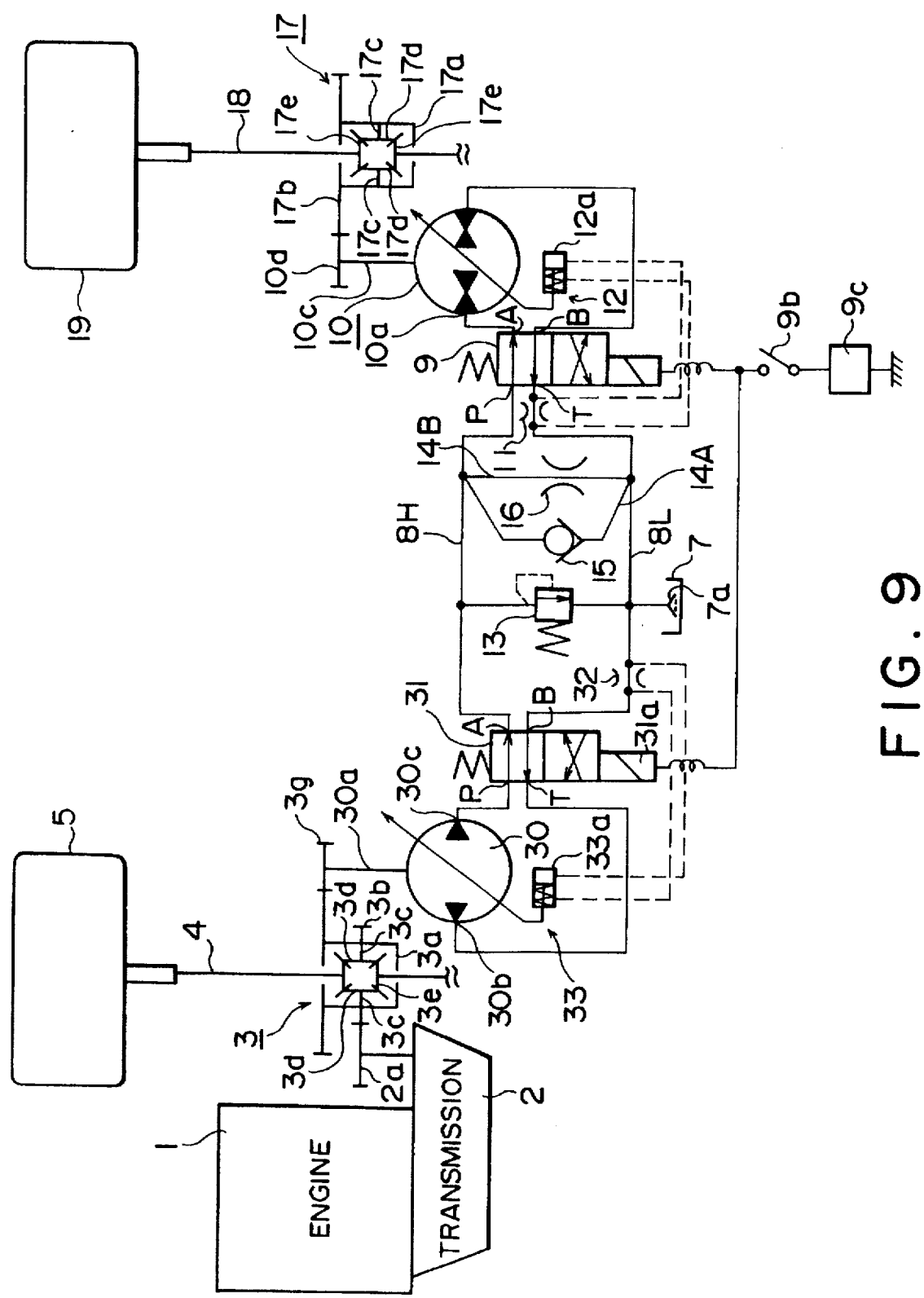
FIG. 9 is a schematic diagram of a four wheel drive system according to a fifth embodiment of this invention.

FIG. 9 shows a fifth embodiment of this invention.

According to this embodiment, instead of the piston pump 6, a pump 30 is provided that reverses the inlet and outlet according to the rotation direction. An inlet 30b and outlet 30c are connected to the high pressure pipe 8H and low pressure pipe 8L via a four-way valve 31. The construction of the four-way valve 31 is the same as that of the four-way valve 9, and it is operated in synchronism with the valve 9 by a switch 9b. The pump 30 may be a gear pump or a vane pump wherein the discharge direction changes according to the rotation direction. This pump 30 controls inclination angle via a hydraulic cylinder 33a that responds to the pressure difference before and after an orifice 32 provided in the low pressure pipe 8L, i.e. to the flowrate change in the low pressure pipe 8L, but a fixed capacity pump may also be used.

According to this embodiment, as in the case of the fourth embodiment, two variable capacity motors can be used instead of the differential device 17.

The four-way valve 9 may also be installed as an independent structure instead of housing it inside the motor 10.

Figure 2B:
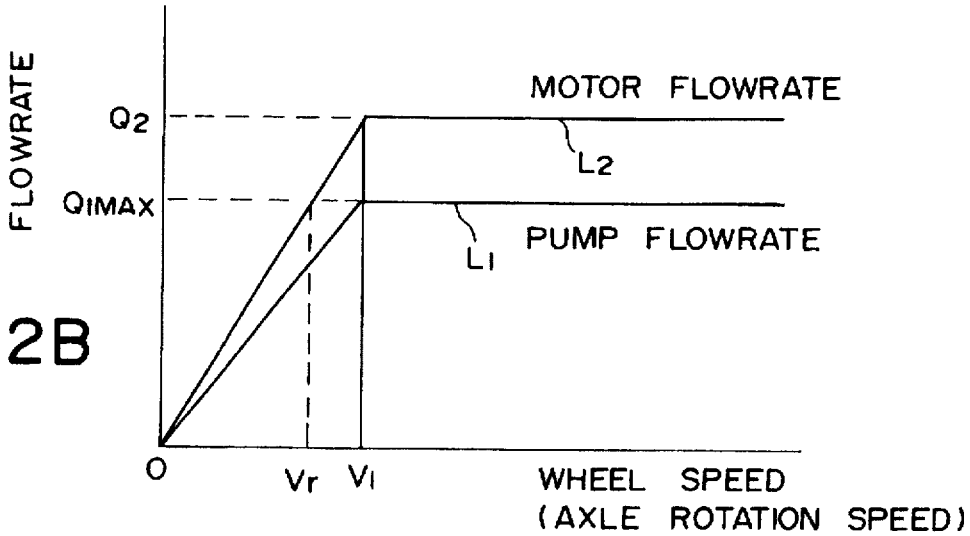
Figure 2C:
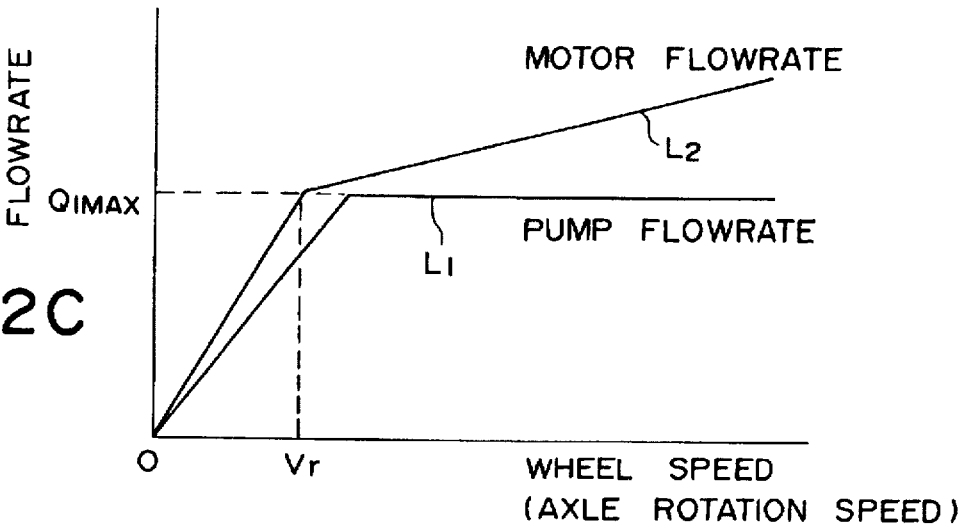

In addition to the characteristics shown in FIG. 2(a), various design modifications may be made to the pump 6 and motor 10. For example, the discharge flowrate of the motor 10 may be held at a fixed value $Q_2$ above a predetermined wheel speed $V_1$ as shown in FIG. 2(b), or the rate of flowrate increase may be reduced starting at a low speed $V_r$ below $V_1$ as shown in FIG. 2(c).

In a four wheel drive vehicle based on rear wheel drive, the pump 6 is installed on the rear wheel side while the motor 10 is installed on the front wheel side.

Figure 10:
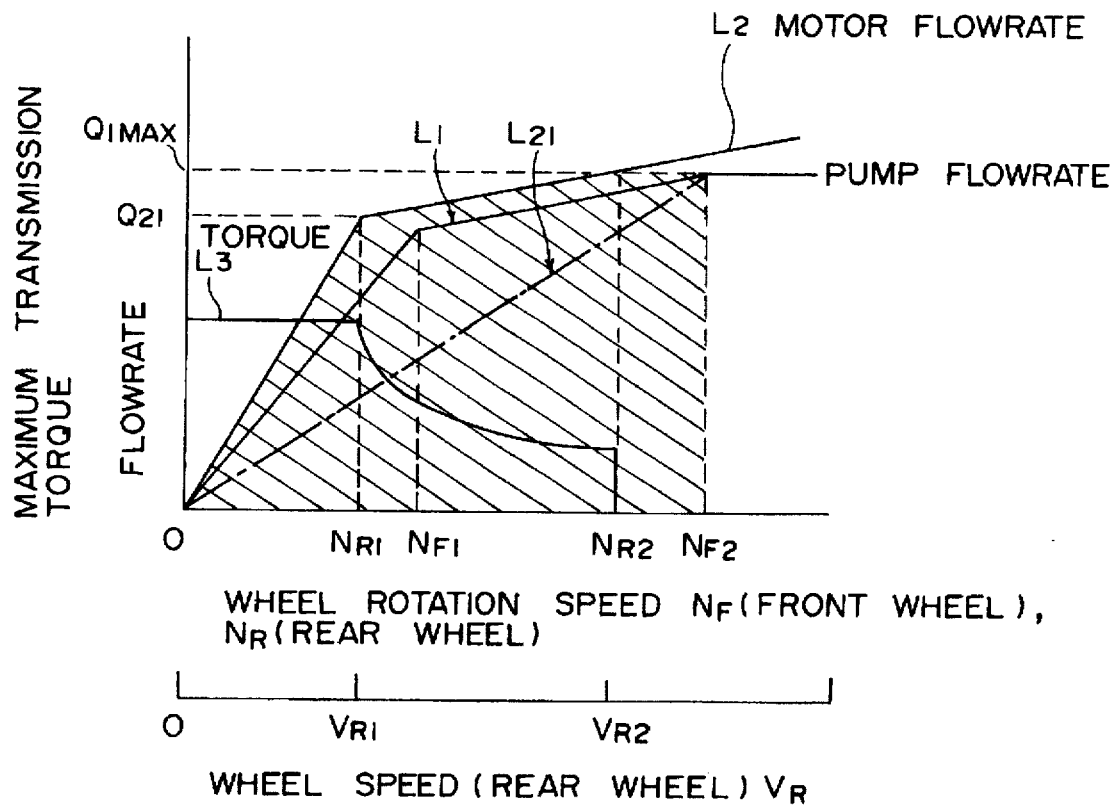
FIG. 10 is a graph showing characteristics of a piston pump and swash plate motor according to a sixth embodiment of this invention.

FIG. 10 shows a sixth embodiment of the invention.

According to this embodiment, the flowrate characteristics of the pump 6 are set as shown by the crooked line $L_1$ in the figure. In other words, they are set so that the discharge flowrate increases at a comparatively high rate from a front wheel rotation speed of 0 up to a predetermined value $N_{F1}$. Above $N_{F1}$, the discharge flowrate increases at a smaller rate, and when the vehicle is running at high speed at a rotation speed of $N_{F2}$ that does not require four wheel drive, it levels off after reaching a maximum flowrate $Q_{lmax}$.

The motor 10 is set so that, as shown by the crooked line $L_2$, the discharge flowrate increases at a higher rate than the flowrate of the pump 6 until the rear wheel rotation speed reaches $N_{R1}$, and when the speed exceeds $N_{R1}$, it increases at a rate effectively equal to the rate of increase between the rotation speeds $N_{F1}$ and $N_{F2}$ of the pump 6.

According to the aforesaid first embodiment, the maximum transmitted torque is constant from a rear wheel rotation speed of 0 to $V_r$, and when the discharge flowrate of the motor 10 reaches the maximum discharge flowrate $Q_{max}$ of the pump 6 at a rotation speed of $V_r$, the maximum transmitted torque is 0.

According to this embodiment, on the other hand, the maximum transmitted torque gradually decreases from when the rear wheel speed exceeds $N_{R1}$ to when it reaches $N_{R2}$ as shown by the curve $L_3$. A smooth transition from four wheel drive to two wheel drive therefore takes place as the rotation speed increases, and the driver does not experience any unpleasant sensation due to an abrupt change-over.

Instead of making the flowrate characteristics of the pump 6 vary with the rotation speed $N_{F1}$, they can also be increased at a fixed rate up to the rotation speed $N_{F2}$ when the maximum discharge flowrate $Q_{lmax}$ is reached as shown by the dotted line $L_{21}$ in FIG. 10. Also, torque can be transmitted between the front and rear wheels provided that the flowrate characteristics of the pump 6 are within the shaded area of FIG. 10, however if the flowrate difference of the pump 6 and motor 10 is too large, torque is not transmitted unless there is an extreme difference of rotation speed. It is therefore preferable to set the flowrate characteristics of the pump 6 to be between the crooked line $L_1$ and the dotted line $L_{21}$.

Figure 11:
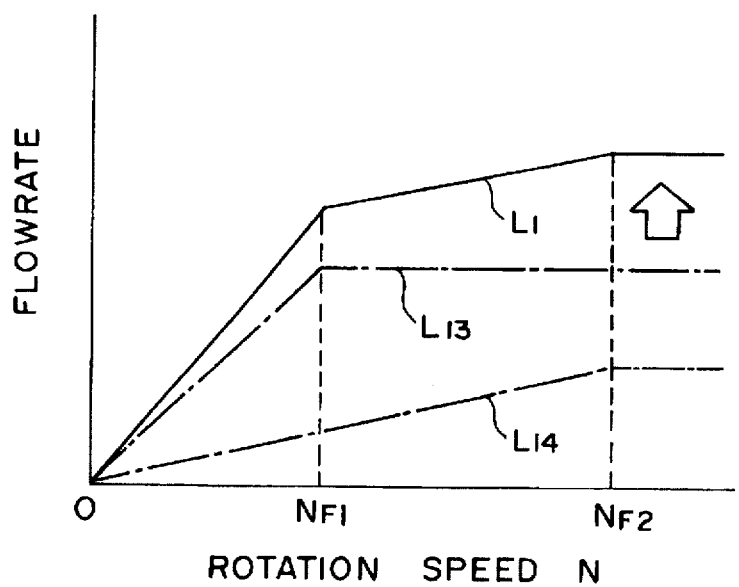
FIG. 11 is a graph showing characteristics of a combination of pumps in order to obtain the characteristics specified in FIG. 10.

In order to obtain these flowrate characteristics, the pump 6 is not limited to an intake throttle type, and a variable capacity type may also be employed. Alternatively, as shown in FIG. 11, a radial piston pump having the characteristics of the crooked line $L_{13}$ and a radial piston pump having the characteristics of the crooked line $L_{14}$ may be connected in parallel so as to obtain the characteristics shown by the crooked line $L_1$.

Figure 12:
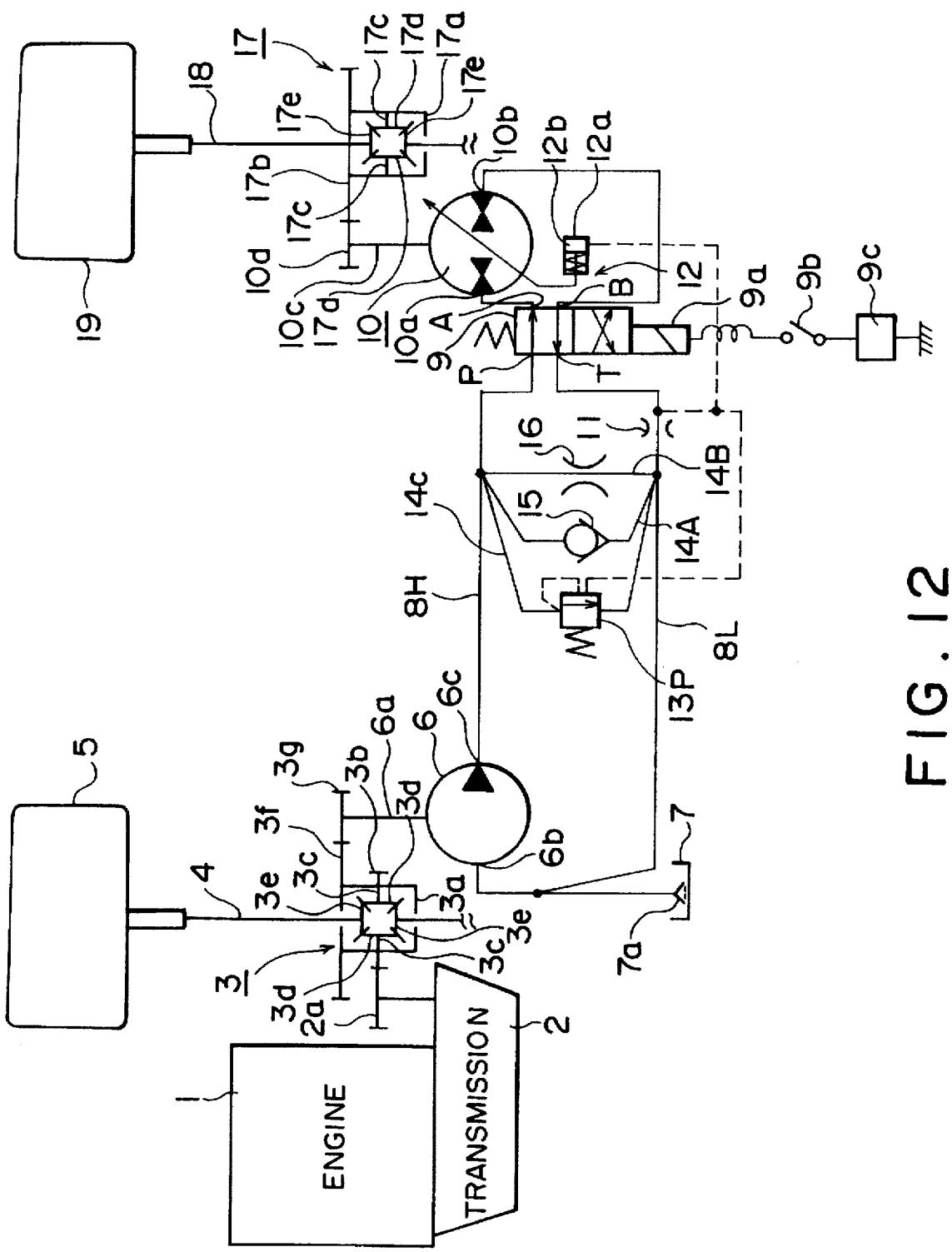
FIG. 12 is a schematic diagram of a four wheel drive system according to a seventh embodiment of this invention.

FIG. 12 shows a seventh embodiment of this invention.

According to this embodiment, the relief valve 13 is a pilot relief valve 13P that opens under the pressure upstream of the orifice 11 as a pilot pressure.

Figure 13:
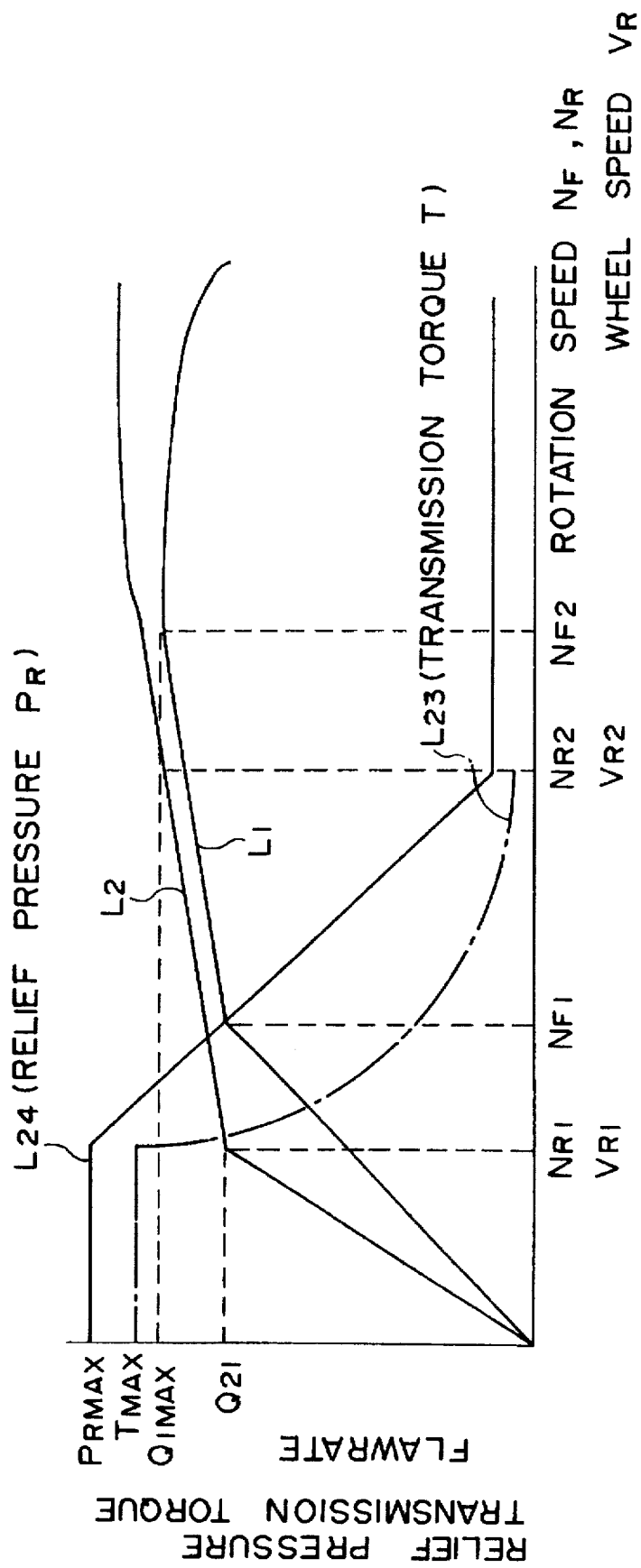
FIG. 13 is a graph showing characteristics of a piston pump and sash plate motor according to the seventh embodiment of this invention.

As shown by FIG. 13, the relief pressure of the pilot relief valve 13P is maintained at a maximum set pressure $P_{Rmax}$ as shown by the crooked line $L_{24}$ until the rear wheel rotation speed $N_{R1}$ when the discharge flowrate of the motor 10 reaches the predetermined value $Q_{21}$, decreases with increase of rear wheel rotation speed beyond $N_{R1}$, and levels off after reaching a minimum value at a rear wheel speed $N_{R2}$ when the discharge flowrate of the motor 10 becomes equal to the maximum discharge flowrate $Q_{lmax}$ of the pump 6.

According to this embodiment, after the rear wheel rotation speed exceeds $N_{R1}$, the relief pressure of the relief valve 13P decreases with rise of pilot pressure. The pressure in the high pressure pipe 8H is therefore limited, and the maximum torque that can be transmitted decreases more rapidly compared to the aforesaid sixth embodiment wherein the relief pressure is constant. Moreover, as the relief pressure takes a value quite close to 0 immediately before the rear wheel speed $N_{R2}$ when the discharge flowrate of the motor 10 becomes equal to the maximum discharge flowrate $Q_{lmax}$ of the pump 6, the maximum transmitted torque also decreases to nearly 0 immediately before the rear wheel speed $N_{R2}$. There is therefore only a small jump when the maximum transmitted torque reaches 0 at the rear wheel speed $N_{R2}$, and the transition from four wheel drive to two wheel drive takes place more smoothly than in the case of the aforesaid sixth embodiment. If the relief pressure is set to be 0 at the rear wheel speed $N_{R2}$, this jump is nil.

Further, as the relief pressure of the relief valve 13P decreases with increase of rear wheel rotation speed, the region where the maximum pressure acts on the high pressure pipe 8H is below the rear wheel rotation speed $N_{R1}$. As a result, high pressure acts less frequently than in the case of the other embodiments where the maximum pressure acts up to the rear wheel speed $N_{R2}$. Less pressure-resisting material and surface treatment are therefore required to ensure that the high pressure pipe 8H withstands pressure, and cost is reduced.

Figure 14:
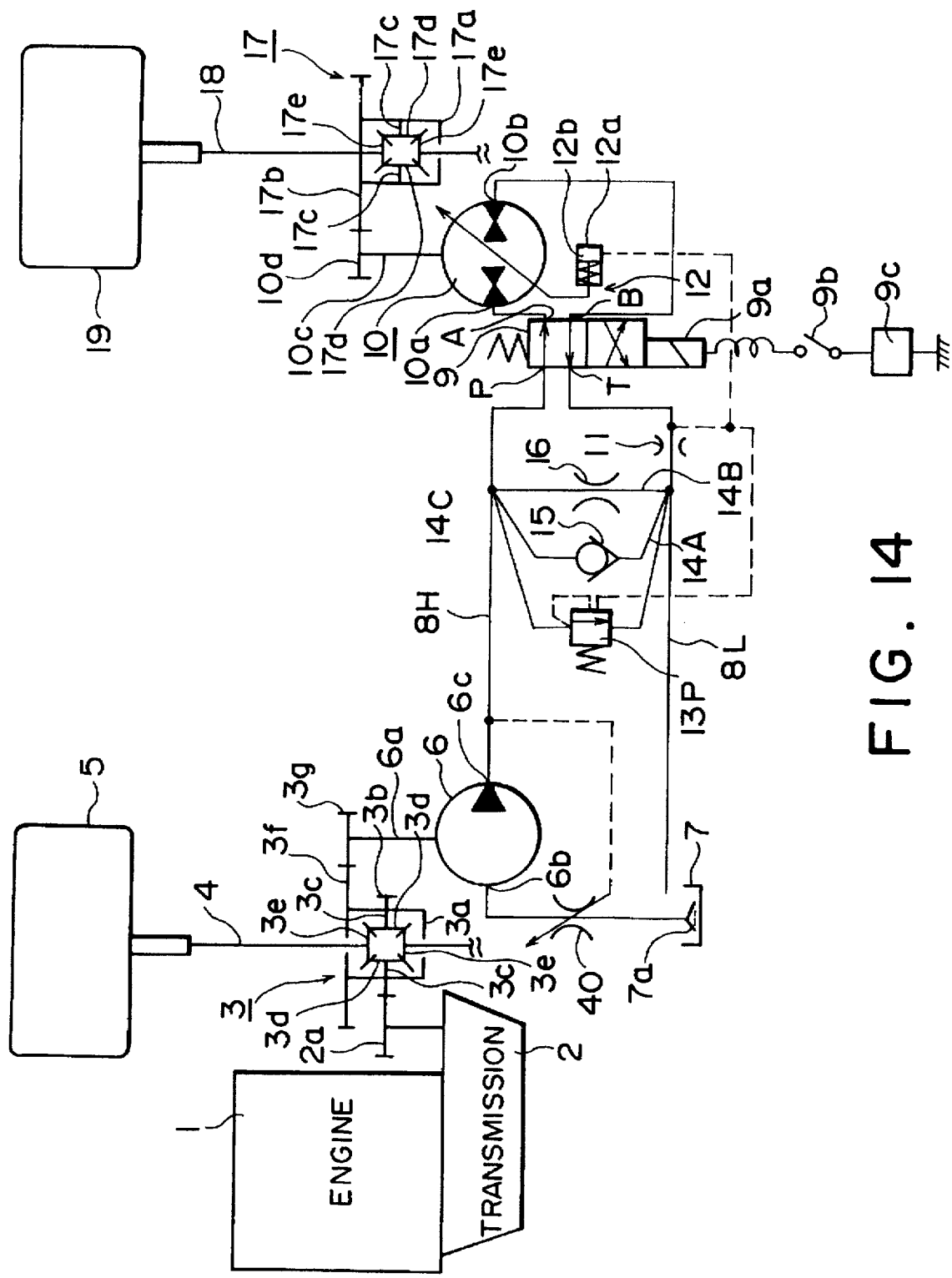
FIG. 14 is a schematic diagram of a four wheel drive system according to an eighth embodiment of this invention.

FIG. 14 shows an eighth embodiment of the invention.

According to this embodiment, in addition to the structure of the seventh embodiment, a variable orifice 40 is provided at the inlet 6b of the pump 6. The pressure of the outlet 6a is led to the variable orifice 40 as a pilot pressure. The variable orifice 40 is set to a slightly lower pressure than the maximum relief pressure $P_{Rmax}$ of the relief valve 13P, and when the pump discharge pressure exceeds this set pressure, it again decreases.

This variable orifice 40 limits the discharge pressure of the pump 6 when the pressure in the high pressure pipe 8H is rising, so the flowrate through the relief valve 13P decreases, and increase of oil temperature due to flow of working oil in the relief valve 13P is suppressed.

According to the seventh and eighth embodiments, the pilot pressure of the pilot relief valve 13P is taken from the upstream side of the orifice 11, but another pressure may also be used as the pilot pressure. For example, as there is a linear relationship between the vehicle speed and the wheel rotation speed, the governor pressure of the automatic gearbox may also be supplied to the pilot relief valve 13 as a pilot pressure.

Further, the relief valve 13 may be a proportional electromagnetic relief valve, the energizing current of the relief valve being electrically controlled according to the vehicle speed. The vehicle speed may be detected from the rotation speed of the output shaft of the gearbox 2, or the rear wheel rotation speed detected by a wheel speed sensor.

The embodiments of this invention in which an exclusive property or privilege is claimed are defined as follows:

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. A four wheel drive mechanism, comprising:

drive wheels driven by an engine;

driven wheels that rotate due to contact with a road surface;

fluid pressure pump means driven together with said drive wheels, said pump means being provided with a fluid inlet and outlet, and pressurizing a fluid aspirated from said inlet so as to discharge it from said outlet;

fluid pressure motor means rotating together with said driven wheels and having two ports for aspirating and discharging said fluid, said motor means driving said driven wheels by supplying a pressurized fluid to one of said ports while on the other hand circulating said fluid from one port to the other port according to an input of rotation torque from said driven wheels and having a larger flow rate than said pump means when a rotation speed of said drive wheels is equal to a rotation speed of said driven wheels;

a high pressure flowpath connected to said outlet of said pump means;

a low pressure flowpath connected to said inlet of said pump means;

means for connecting said high pressure flowpath and low pressure flowpath to said two ports of said motor means, said connecting means reversing a direction of connection when a rotation direction of said drive wheels is reversed;

means for limiting a torque transmitted from said pump means to said motor means so as not to exceed a predetermined value;

means for decreasing a fluid discharge volume of said pump means per unit rotation of said pump means according to an increase of the rotation speed of said drive wheels when said rotation speed is higher than a predetermined speed; and capacity control means for varying a fluid circulation volume of said motor means per unit rotation of said motor means according to a flowrate of said low pressure flowpath.

2. The four wheel drive mechanism as defined in claim 1, wherein:

said torque limiting means comprises means for limiting a pressure in said high pressure flowpath so as not to exceed a predetermined value.

3. The four wheel drive mechanism as defined in claim 1, wherein:

said connecting means is formed in a one-piece construction with said motor means.

4. The four wheel drive mechanism as defined in claim 1, wherein:

said motor means comprises capacity control means that varies a fluid flowrate per unit rotation of said motor means according to a flowrate of said low pressure flowpath.

5. The four wheel drive mechanism as defined in claim 1, wherein:

said pump means comprises means for maintaining a discharge flowrate of said pump means at a predetermined value when a rotation speed of said drive wheels is higher than a predetermined speed.

6. The four wheel drive mechanism as defined in claim 1, wherein:

said pump means comprises a pump wherein said inlet and outlet are reversed according to a rotation direction of said drive wheels and means for respectively connecting said inlet to said high pressure flowpath and said outlet to said low pressure flowpath when said direction is reversed.

7. The four wheel drive mechanism as defined in claim 1, wherein:

said mechanism further comprises a flowpath provided with a throttle means, said flowpath connecting said high pressure flowpath and low pressure flowpath.

8. The four wheel drive mechanism as defined in claim 1, wherein:

said pump means comprises a piston pump with a throttle valve interposed in said inlet.

9. The four wheel drive mechanism as defined in claim 1, wherein:

said capacity control means increases a fluid circulation flowrate of said motor means as the rotation speed of said driven wheels rises until the flowrate in said low pressure flowpath reaches a set value, and maintains said fluid circulation flowrate at a constant level when the flowrate in said low pressure flowpath exceeds said set value.

10. The four wheel drive mechanism as defined in claim 1, further comprising:
orifice means interposed in said low pressure flowpath, and said capacity control means varies a fluid circulation flowrate of said motor means according to a pressure difference between upstream and downstream of said orifice.

11. A four wheel drive mechanism as defined in claim 1, wherein:
a maximum value of said torque transmitted from said pump means to said motor means begins to decrease at a first rotation speed of said driven wheels and a fluid circulation volume of said motor means per unit rotation of said motor means decreases according to an increase of a rotation speed of said driven wheels above the first speed, and a fluid discharge flowrate of said pump means takes a maximum value at a second speed of said driven wheels at which transmitting of the torque from said pump means to said motor means is not performed.

12. The four wheel drive mechanism as defined in claim 1, wherein:
the fluid discharge flowrate of said pump means begins to decrease at a rotation speed of said drive wheels higher than said predetermined speed.

13. The four wheel drive mechanism as defined in claim 11, wherein:
said pump means comprises a plurality of pumps having different flowrate characteristics.

14. The four wheel drive mechanism as defined in claim 11, wherein:
said mechanism further comprises a relief valve for discharging said fluid from said high pressure flowpath at a predetermined relief pressure, and means for decreasing said relief pressure when said rotation speed of said driven wheels is equal to or greater than the first speed.

15. A four wheel drive mechanism as claimed in claim 14, wherein:
said decreasing means decreases said relief pressure to substantially zero at the second speed.

16. A four wheel drive mechanism as defined in claim 14, wherein:
said mechanism further comprises an orifice interposed in said low pressure flowpath and said decreasing means decreases said relief pressure according to a pressure rise of said low pressure flowpath upstream of said orifice.

17. A four wheel drive mechanism as defined in claim 1, wherein:
said decreasing means maintains the fluid discharge flowrate of said pump means at a predetermined value when a rotation speed of said drive wheels is higher than the predetermined speed.

18. A four wheel drive mechanism as defined in claim 13, wherein:
a fluid circulation volume of said motor means per unit rotation of said motor means decreases according to an increase of a rotation speed of said driven wheels above a first speed at which a maximum value of said torque begins to decrease, while a fluid discharge volume of said pump means per unit rotation of said pump means begins to decrease at a rotation speed of said drive wheels higher than said first speed, and a fluid discharge flowrate of said pump means takes a maximum value at a second speed of said driven wheels above which transmitting of the torque from said pump means to said motor means is not performed.

19. A four wheel drive mechanism, comprising:
drive wheels driven by an engine;
driven wheels that rotate due to contact with a road surface;
fluid pressure pump means driven together with said drive wheels, said pump means being provided with a fluid inlet and outlet, and pressurizing a fluid aspirated from said inlet so as to discharge it from said outlet;
fluid pressure motor means rotating together with said driven wheels and having two ports for aspirating and discharging said fluid, said motor means driving said driven wheels by supplying a pressurized fluid to one of said ports while on the other hand circulating said fluid from one port to the other port according to an input of rotation torque from said driven wheels;
a high pressure flowpath connected to said outlet of said pump means;
a low pressure flowpath connected to said inlet of said pump means;
means for connecting said high pressure flowpath and low pressure flowpath to said two ports of said motor means, said connecting means reversing a direction of connection when a rotation direction of said drive wheels is reversed;
means for limiting a torque transmitted from said pump means to said motor means so as not to exceed a predetermined value,
wherein said torque limiting means comprises a throttle valve interposed in said inlet, and the opening of said valve decreases when a pump discharge pressure rises above a set pressure.

20. A four wheel drive mechanism, comprising:
drive wheels driven by an engine;
driven wheels that rotate due to contact with a road surface;
fluid pressure pump means driven together with said drive wheels, said pump means being provided with a fluid inlet and outlet, and pressurizing a fluid aspirated from said inlet so as to discharge it from said outlet;
fluid pressure motor means rotating together with said driven wheels and having two ports for aspirating and discharging said fluid, said motor means driving said driven wheels by supplying a pressurized fluid to one of said ports while on the other hand circulating said fluid from one port to the other port according to an input of rotation torque from said driven wheels;
a high pressure flowpath connected to said outlet of said pump means;
a low pressure flowpath connected to said inlet of said pump means;
means for connecting said high pressure flowpath and low pressure flowpath to said two ports of said motor means, said connecting means reversing a direction of connection when a rotation direction of said drive wheels is reversed;
means for limiting a torque transmitted from said pump means to said motor means so as not to exceed a predetermined value,
wherein said capacity control means increases the fluid flowrate of said motor means as the rotation speed of said driven wheels rises until the flowrate in said low pressure flowpath reaches a set value, and maintains said fluid flowrate at a constant level when the flowrate in said low pressure flowpath exceeds said set value.

21. A four wheel drive mechanism, comprising:

drive wheels driven by an engine;

driven wheels that rotate due to contact with a road surface;

fluid pressure pump means driven together with said drive wheels, said pump means being provided with a fluid inlet and outlet, and pressurizing a fluid aspirated from said inlet so as to discharge it from said outlet;

fluid pressure motor means rotating together with said driven wheels and having two ports for aspirating and discharging said fluid, said motor means driving said driven wheels by supplying a pressurized fluid to one of said ports while on the other hand circulating said fluid from one port to the other port according to an input of rotation torque from said driven wheels;

a high pressure flowpath connected to said outlet of said pump means;

a low pressure flowpath connected to said inlet of said pump means;

means for connecting said high pressure flowpath and low pressure flowpath to said two ports of said motor means, said connecting means reversing a direction of connection when a rotation direction of said drive wheels is reversed;

means for limiting a torque transmitted from said pump means to said motor means so as not to exceed a predetermined value, wherein said capacity control means increases the fluid flowrate of said motor means at a first rate of increase with respect to a rotation speed of said driven wheels when the flowrate in said low pressure flowpath does not exceed a set value, and increases said fluid flowrate at a second rate of increase less than said first rate with respect to said rotation speed when said set value is exceeded.

22. A four wheel drive mechanism, comprising:

drive wheels driven by an engine;

driven wheels that rotate due to contact with a road surface;

fluid pressure pump means driven together with said drive wheels, said pump means being provided with a fluid inlet and outlet, and pressurizing a fluid aspirated from said inlet so as to discharge it from said outlet;

fluid pressure motor means rotating together with said driven wheels and having two ports for aspirating and discharging said fluid, said motor means driving said driven wheels by supplying a pressurized fluid to one of said ports while on the other hand circulating said fluid from one port to the other port according to an input of rotation torque from said driven wheels;

a high pressure flowpath connected to said outlet of said pump means;

a low pressure flowpath connected to said inlet of said pump means;

means for connecting said high pressure flowpath and low pressure flowpath to said two ports of said motor means, said connecting means reversing a direction of connection when a rotation direction of said drive wheels is reversed;

means for limiting a torque transmitted from said pump means to said motor means so as not to exceed a predetermined value, wherein said mechanism further comprises orifice means provided in said low pressure flowpath between said connecting means and said pump means and means for detecting a pressure difference between upstream and downstream of said orifice means, and said capacity control means comprises means for varying said fluid flowrate per unit rotation of said motor means based on said pressure difference.

23. A four wheel drive mechanism, comprising:

drive wheels driven by an engine;

driven wheels that rotate due to contact with a road surface;

fluid pressure pump means driven together with said drive wheels, said pump means being provided with a fluid inlet and outlet, and pressurizing a fluid aspirated from said inlet so as to discharge it from said outlet;

fluid pressure motor means rotating together with said driven wheels and having two ports for aspirating and discharging said fluid, said motor means driving said driven wheels by supplying a pressurized fluid to one of said ports while on the other hand circulating said fluid from one port to the other port according to an input of rotation torque from said driven wheels;

a high pressure flowpath connected to said outlet of said pump means;

a low pressure flowpath connected to said inlet of said pump means;

means for connecting said high pressure flowpath and low pressure flowpath to said two ports of said motor means, said connecting means reversing a direction of connection when a rotation direction of said drive wheels is reversed;

means for limiting a torque transmitted from said pump means to said motor means so as not to exceed a predetermined value, wherein said pump means comprises means for decreasing a discharge flowrate of said pump means according to an increase of a rotation speed of said drive wheels when said speed is higher than a predetermined speed.

24. A four wheel drive mechanism, comprising:

drive wheels driven by an engine;

driven wheels that rotate due to contact with a road surface;

fluid pressure pump means driven together with said drive wheels, said pump means being provided with a fluid inlet and outlet, and pressurizing a fluid aspirated from said inlet so as to discharge it from said outlet;

fluid pressure motor means rotating together with said driven wheels and having two ports for aspirating and discharging said fluid, said motor means driving said driven wheels by supplying a pressurized fluid to one of said ports while on the other hand circulating said fluid from the one port to the other port according to an input of rotation torque from said driven wheels;

a high pressure flowpath connected to said outlet of said pump means;

a low pressure flowpath connected to said inlet of said pump means;

means for connecting said high pressure flowpath and low pressure flowpath to said two ports of said motor means, said connecting means reversing a direction of connection when a rotation direction of said drive wheels is reversed;

means for limiting a torque transmitted from said pump means to said motor means so as not to exceed a predetermined value, wherein said pump means comprises a piston pump with a throttle valve interposed in said inlet.

25. A four wheel drive mechanism, comprising:

drive wheels driven by an engine;

driven wheels that rotate due to contact with a road surface;

fluid pressure pump means driven together with said drive wheels, said pump means being provided with a fluid inlet and outlet, and pressurizing a fluid aspirated from said inlet so as to discharge it from said outlet;

fluid pressure motor means rotating together with said driven wheels and having two ports for aspirating and discharging said fluid, said motor means driving said driven wheels by supplying a pressurized fluid to one of said ports while on the other hand circulating said fluid from one port to the other port according to an input of rotation torque from said driven wheels;

a high pressure flowpath connected to said outlet of said pump means;

a low pressure flowpath connected to said inlet of said pump means;

means for connecting said high pressure flowpath and low pressure flowpath to said two ports of said motor means, said connecting means reversing a direction of connection when a rotation direction of said drive wheels is reversed;

means for limiting a torque transmitted from said pump means to said motor means so as not to exceed a predetermined value, wherein said motor means has a larger flowrate than said pump means when a rotation speed of said drive wheels is equal to a rotation speed of said driven wheels, and said mechanism further comprises a flowpath provided with a check valve for supplying said fluid from said low pressure flowpath to said high pressure flowpath.

26. The four wheel drive mechanism as defined in claim 25, wherein:

a capacity of said motor means decreases according to an increase of a rotation speed of said driven wheels above a first speed at which a maximum value of said torque begins to decrease, and a discharge flowrate of said pump means takes a maximum value at a second speed of said driven wheels above which a transmission of torque is not required.

27. The four wheel drive mechanism as defined in claim 25, wherein:

a capacity of said motor means decreases according to an increase of a rotation speed of said driven wheels above a first speed at which a maximum value of said torque begins to decrease, while a capacity of said pump means begins to decrease at a rotation speed of said drive wheels higher than said first speed, and a discharge flowrate of said pump means takes a maximum value at a second speed of said driven wheels above which a transmission of torque is not required.

28. The four wheel drive mechanism as defined in claim 27, wherein:

said pump means comprises a plurality of pumps having different flowrate characteristics.

29. The four wheel drive mechanism as defined in claim 26, wherein:

said mechanism further comprises a relief valve for discharging said fluid from said high pressure flowpath at a predetermined relief pressure, and means for decreasing said relief pressure when said rotation speed of said driven wheels is equal to or greater than said first speed.

30. The four wheel drive mechanism as defined in claim 29, wherein:

said torque limiting means comprises a throttle interposed in said inlet, an opening of said throttle being decreased when a pump discharge pressure rises above a set pressure which is set lower than a maximum value of said relief pressure.

31. The four wheel drive mechanism as defined in claim 29, wherein:

said decreasing means decreases said relief pressure to substantially zero when said discharge flowrate of said pump means takes said maximum value.

32. The four wheel drive mechanism as defined in claim 29, wherein:

said mechanism comprises an orifice interposed in said low pressure flowpath and said decreasing means decreases said relief pressure according to a pressure rise of said low pressure flowpath upstream of said orifice.

33. A four wheel drive mechanism, comprising:

drive wheels driven by an engine;

driven wheels that rotate due to contact with a road surface;

fluid pressure pump means driven together with said drive wheels, said pump means being provided with a fluid inlet and outlet, and pressurizing a fluid aspirated from said inlet so as to discharge it from said outlet;

fluid pressure motor means rotating together with said driven wheels and having two ports for aspirating and discharging said fluid, said motor means driving said driven wheels by supplying a pressurized fluid to one of said ports while on the other hand circulating said fluid from one port to the other port according to an input of rotation torque from said driven wheels, and having a larger flowrate than said pump means when a rotation speed of said drive wheels is equal to a rotation speed of said driven wheels;

a high pressure flowpath connected to said outlet of said pump means;

a low pressure flowpath connected to said inlet of said pump means;

means for connecting said high pressure flowpath and low pressure flowpath to said two ports of said motor means, said connecting means reversing a direction of connection when a rotation direction of said drive wheels is reversed;

means for limiting a torque transmitted from said pump means to said motor means so as not to exceed a predetermined value; and a throttle valve interposed in said inlet, the opening of said valve decreasing when a pump discharge pressure rises above a set pressure.

34. A four wheel drive mechanism as defined in claim 33, further comprising:

a relief valve for discharging said fluid from said high pressure flowpath at a predetermined relief pressure which is set to be higher than said set pressure.

* * * * *